United States Patent
Gaither et al.

(10) Patent No.: US 6,701,023 B1
(45) Date of Patent: Mar. 2, 2004

(54) REDUCING APPEARANCE DIFFERENCES BETWEEN CODED AND NONCODED UNITS OF TEXT

(75) Inventors: Shawn A. Gaither, Santa Cruz, CA (US); Maurice D. Fisher, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/408,480

(22) Filed: Sep. 29, 1999

(51) Int. Cl.[7] .................................................. G06K 9/40
(52) U.S. Cl. ...................................... 382/254; 358/1.11
(58) Field of Search ................................. 382/269, 254; 358/2.01, 2.28, 1.11, 1.1, 3.02, 3.1, 3.27; 345/471, 467, 468, 589

(56) References Cited

U.S. PATENT DOCUMENTS

| | | | | |
|---|---|---|---|---|
| 5,647,023 A | * | 7/1997 | Agazzi et al. | 382/209 |
| 5,729,637 A | | 3/1998 | Nicholson et al. | 382/282 |
| 5,959,635 A | * | 9/1999 | Watanabe et al. | 345/469 |
| 6,324,500 B1 | * | 11/2001 | Amro et al. | |
| 6,389,178 B1 | * | 5/2002 | Agazzi et al. | 382/276 |
| 6,563,502 B1 | * | 5/2003 | Dowling et al. | 345/469.1 |

OTHER PUBLICATIONS

O.E. Agazzi, et al., "Using OCR and Equalization to Downsample Documents," Proceedings of the IAPR International Conference on Pattern Recognition, Jerusalem, Oct. 9–13, 1994. Conference B: Pattern Recognition and Neural Networks, Los Alamitos, IEEE Comp. Soc. Press, US, vol. 2, Conf. 12, ISBN: 0–8186–6272–7, pp. 305–309, Oct. 9, 1994.

* cited by examiner

*Primary Examiner*—Yon J. Couso
(74) *Attorney, Agent, or Firm*—Fish & Richardson P.C.

(57) ABSTRACT

Methods and apparatus, including computer program apparatus and systems, for processing text that includes coded (character based) and noncoded (image based) representations of text. The invention includes deriving a correction factor from a coded representation of a second unit of text and an original noncoded representation of the second unit of text, and modifying a representation of a first unit of text in accordance with the correction factor, where a common font typeface is attributed to both the first and second units. The correction factor can be calculated by rendering a coded representation of the second unit of text in the font typeface to generate a rendered representation, calculating a reference ratio from the rendered representation and an optical density of an original noncoded representation of the second unit of text, and inverting the reference ratio to calculate the correction factor. Where the first unit of text includes a word, the optical density of the word can be adjusted by modifying a bitmap representation of the word, where pixels are added to, or removed from, the bitmap, or the bitmap is left unchanged, according to the value of the correction factor.

32 Claims, 4 Drawing Sheets

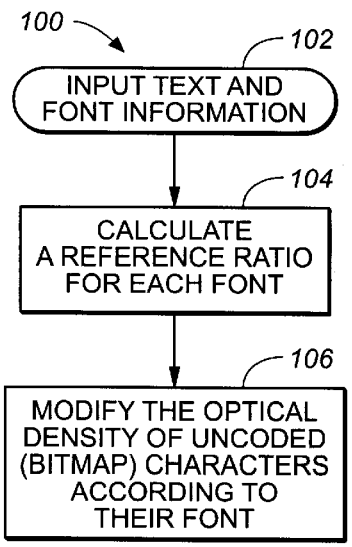
FIG._1A
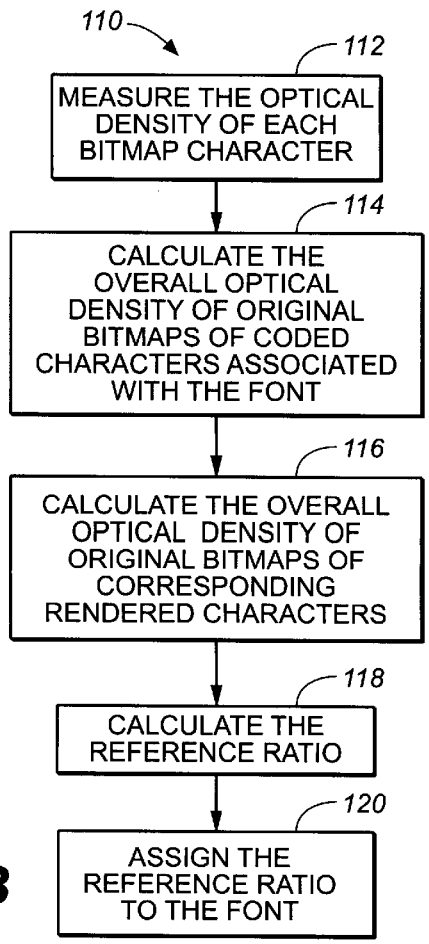
FIG._1B
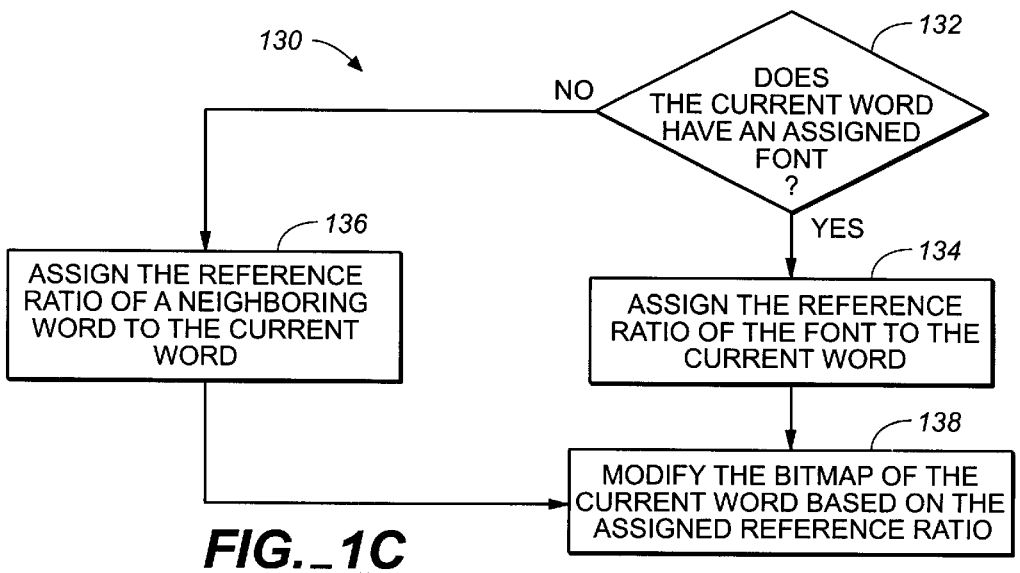
FIG._1C

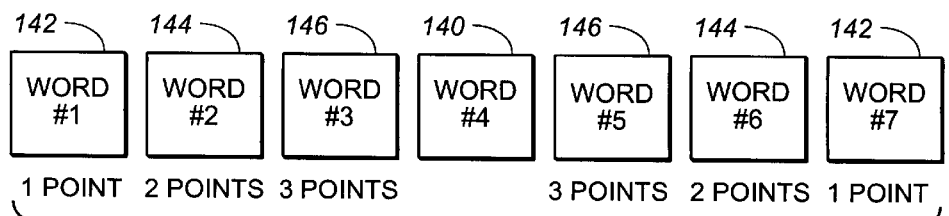
FIG._1D
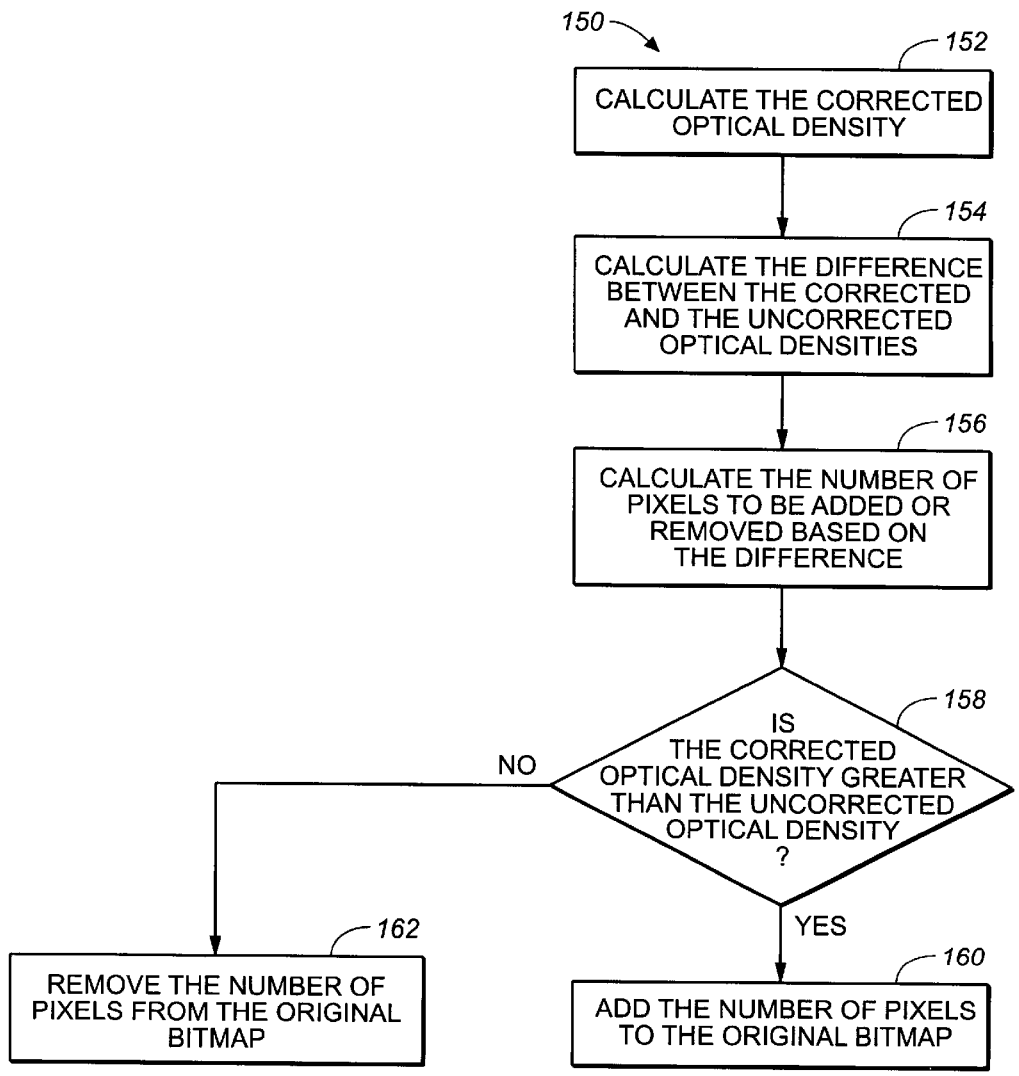
FIG._1E

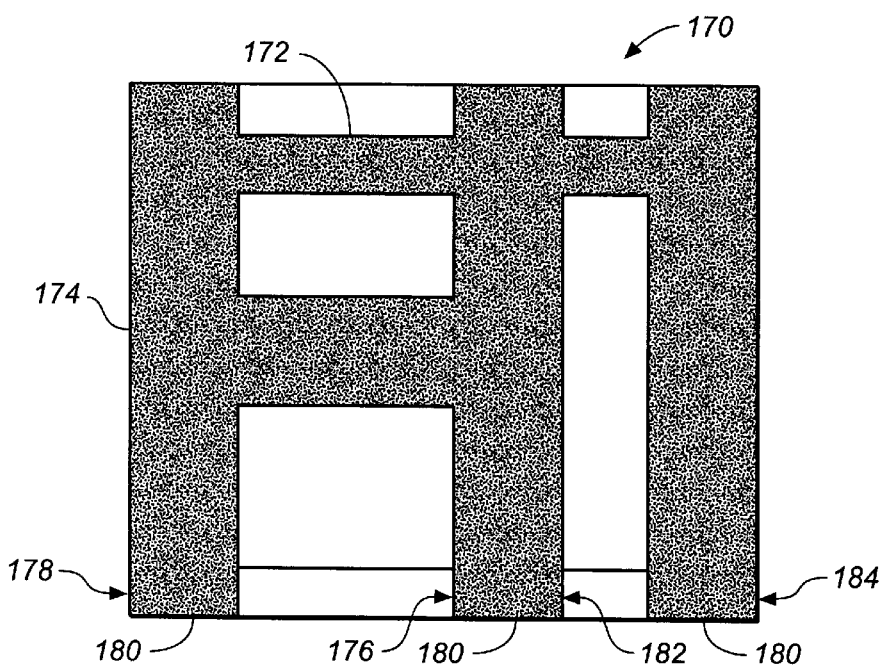
FIG._1F

1.06 Nam liber a tempor cum soluta nobis eligend optio comgue nihil a quod impedit anim id quod maxim platfacer possim omnis in voluptas atolclvo assumenda est, omnis dolor repellend qui officia deserunt mollit anim id est laborum et dolor.

FIG. 2A

1.06 Nam liber a tempor cum soluta nobis eligend optio comgue nihil a quod impedit anim id quod maxim platfacer possim omnis in voluptas atolclvo assumenda est, omnis dolor repellend qui officia deserunt mollit anim id est laborum et dolor.

FIG. 2B

1.06 Nam liber a tempor cum soluta nobis eligend optio comgue nihil a quod impedit anim id quod maxim platfacer possim omnis in voluptas atolclvo assumenda est, omnis dolor repellend qui officia deserunt mollit anim id est laborum et dolor.

FIG. 2C

REDUCING APPEARANCE DIFFERENCES BETWEEN CODED AND NONCODED UNITS OF TEXT

BACKGROUND OF THE INVENTION

The present invention relates to processing text that includes coded and noncoded units of text.

An image of text, such as one on a piece of paper, can be converted into a digital representation by digitization. A digital representation of text can be a coded or noncoded representation.

A coded representation of text is character based; that is, it is a representation in which the text has been interpreted as characters. The characters are typically represented by character codes, such as codes defined by the ASCII or Unicode Standard character encoding standards, but may also be represented by character names. The universe of characters in any particular context can include, just by way of example, letters, numerals, phonetic symbols, ideographs, punctuation marks, diacritics, mathematical symbols, technical symbols, arrows, dingbats, and so on. A character is an abstract entity. How a character is represented visually—e.g., as a glyph on a screen or a piece of paper—is generally defined by a font defining a particular typeface. In digital or computer-based applications typography, a digital font, which will now be referred to simply as a "font", such as any of the PostScript® fonts available from Adobe Systems Incorporated of San Jose, Calif., generally includes instructions (commonly read and interpreted by rendering programs executing on computer processors) for rendering characters in a particular typeface. A coded representation can also be referred to as a character-based representation.

A noncoded representation of text is an image representation. It is a primitive representation in which the text is not interpreted into characters. Instead, it may be represented as an array of picture elements ("pixels"). A bitmap is one primitive representation, in which each pixel is represented by one binary digit or bit in a raster. A pixel map is a raster representation in which each pixel is represented by more than one bit. An image representation of a page of text, for example, can be divided into lexical units, each of which can have a coded as well as a noncoded representation, as will be described.

Digitization of an image generally results in primitive representation, typically a bitmap or pixel map. If the image contains text, the primitive representation can be interpreted and converted to a higher-level coded format such as ASCII through use of an optical character recognition (OCR) program. A confidence-based recognition system, such as the one described in commonly-owned U.S. Pat. No. 5,729,637 (the '637 patent), processes an image of text, recognizes bitmap images as characters, and converts the recognized bitmaps into codes that represent the corresponding characters. Some words may be recognized only with a low level of confidence or not recognized at all. When the image is displayed, low-confidence words are displayed in their original bitmap form, while words recognized with sufficiently high confidence are displayed from a rendering of their codes.

A digital representation of an image including both coded and noncoded units can be displayed on a raster output device such as a computer display or printer. This type of display, i.e., one containing both original and rendered bitmaps, will be referred to as a hybrid display. The coded units are rendered (i.e., rasterized), which may be accomplished in a variety of ways, such as by retrieving an output bitmap stored in memory for a code or by computing an output bitmap according to a vector description associated with a code. The result will be referred to as a rendered bitmap. The noncoded units are displayed in their original bitmap form, which will be referred to as original bitmaps. Typically, whole words are either rendered or left as original bitmaps for display on raster output devices.

The original and the rendered bitmaps of a hybrid display typically tend to have different optical densities. This difference in optical densities causes the appearance of the original and rendered bitmaps to differ. The resulting hybrid display may therefore lack a uniform appearance and may not be aesthetically pleasing.

SUMMARY OF THE INVENTION

In general, in one aspect, the invention features techniques that can be implemented as methods, systems, or apparatus, including computer program products and apparatus, for processing text that includes coded (character based) and noncoded (image based) representations of text. The techniques include deriving a correction factor from a coded representation of a second unit of text and an original noncoded representation of the second unit of text, and modifying a representation of a first unit of text in accordance with the correction factor, where a common font typeface is attributed to both the first and second units. Advantageous implementations include one or more of the following features. The correction factor is calculated by rendering a coded representation of the second unit of text in the font typeface to generate a rendered representation, calculating a reference ratio from the rendered representation and an optical density of an original noncoded representation of the second unit of text, and inverting the reference ratio to calculate the correction factor. Where the first unit of text includes a word, the optical density of the word is adjusted by modifying a bitmap representation of the word, where pixels are added to, or removed from, the bitmap, or the bitmap is left unchanged, according to the value of the correction factor.

In general, in another aspect, the invention features an electronic document representing text in a page description language, where the text has a first unit and a second unit, and where a common font typeface is attributed to both the first and the second unit of text. The electronic document has a coded representation of the second unit of text in characters of the common font typeface. The electronic document also has a final raster representation of the first unit of text that is a modified representation generated from an original noncoded representation of the first unit of text according to a correction factor that was computed from a noncoded representation of the second unit of text and an optical density of a rendered coded representation of the second unit of text. Advantageous implementations include one or more of the following features. The original noncoded representation of the first unit of text is derived from a scanned image of a portion of a paper document containing the first unit of text.

Advantages that can be seen in implementations of the invention include one or more of the following. The invention allows a hybrid display to appear uniform and aesthetically pleasing. The invention facilitates visual reading and recognizing of bitmap units displayed on a raster-output device.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1A is a flow diagram illustrating a method for modifying the optical densities of original bitmaps to reduce their differences to the optical densities of rendered bitmaps.

FIG. 1B is a flow diagram of a reference-ratio calculation step.

FIG. 1C is a flow diagram of an optical density modification step.

FIG. 1D is a block diagram illustrating an assignment of reference ratio.

FIG. 1E is a flow diagram of a bitmap modification step.

FIG. 1F is a diagram illustrating a bitmap modification.

FIG. 2A is an example of a bitmap representation of text from which a hybrid display is derived.

FIG. 2B is an example of a hybrid display before modification.

FIG. 2C is an example of the hybrid display of FIG. 2B modified in accordance with one implementation of the invention.

DETAILED DESCRIPTION

FIG. 2A shows an bitmap representation of text from which a hybrid display is derived through a conventional OCR process. FIG. 2B and FIG. 2C show a corresponding pair of hybrid displays. FIG. 2B is a display generated by a system of the kind described in the '637 patent, while FIG. 2C shows a hybrid display in which the non-rendered display elements are modified to reduce the visual difference between the original bitmaps and the rendered bitmaps.

FIG. 1A illustrates a method 100 for modifying original bitmaps to reduce the visual differences to rendered bitmaps in a hybrid display of a piece of text. The method 100 can be implemented in a computer program, such as a module in a larger system for processing and displaying electronic documents, a plug-in module, a module in driver software for an output device, a module in a page description language interpreter (such as a PostScript® language interpreter), in an output device such as a printer, or otherwise.

The method 100 has two primary steps: calculating a reference ratio for a font (step 104), and modifying the optical densities of any bitmaps associated with the font (step 106). In this context, a reference to a font refers also to the typeface defined by the font. Inputs 102 to the method include a bitmap representation of a text and a coded representation of at least part of the text. These inputs may be a hybrid data structure of the kind described in the '637 patent. The inputs also include information delineating characters and words in the page bitmap, for example, by defining a bounding box around each character and word. In addition, the inputs include font attributions; that is, a font (including size and typeface) is associated with each of the characters of the input text.

FIG. 1B illustrates one method 110 of calculating a reference ratio (step 104 of FIG. 1A). In one implementation, the calculation is done at the character level. The optical density of a bitmap of a character is the number of pixels turned on divided by the total number of pixels assigned to represent the character (e.g., the ratio of the number of pixels turned on to the size of the character's bounding box in pixels). The necessary information for original bitmaps can be provided by a conventional OCR process, which identifies the pixels assigned to represent a character and which of those pixels are turned on. In one implementation, for each font, the number of pixels turned on in the bitmap of each character, coded and noncoded, is measured (step 112). Then, the overall optical density of the original bitmaps of coded characters of each font are calculated (step 114). This overall optical density is the ratio of (i) the sum of pixels that are turned on in the original bitmaps of all coded characters of the font to (ii) the sum of the sizes (in pixels) of the bounding boxes of all coded characters of the font. Next, the overall optical density of the rendered bitmaps of the font is calculated (step 116). A digital font, even one that defines characters in terms of mathematical curve outlines, can optionally provide an optical density for each coded character. For each coded character of the font being considered, the optical density is multiplied by the total number of pixels assigned to represent the coded character. The resulting products are summed and divided by the sum of the pixels in the bounding boxes of the coded characters to yield the overall optical density for the rendered bitmaps of coded characters of the font. The ratio of (i) the overall optical density of the original bitmaps of coded characters to (ii) the overall optical density of the rendered bitmaps of the same characters is calculated (step 118). This is the reference ratio and it is assigned to the font (step 120).

FIG. 1C illustrates one method 130 of modifying bitmaps to reduce visual differences (step 106 of FIG. 1A). In this method, the original bitmap words are modified. The process first determines whether an original bitmap word has a font attributed to the word or a majority of characters in the same font (step 132). If the original bitmap word does have a font attributed to the word or does have a majority of characters in a given font, then the word is said to be in this font and the reference ratio of the font is assigned to the word (step 134). If the word does not have a font attributed to the word or a majority of characters in the same font, then the reference ratio of a neighboring word is assigned to the word (step 136). In one implementation, the three words preceding and the three words following the word in question are used to assign a reference ratio to the word in question. These words are assigned points according to their proximity to the word in question. For example, as shown in FIG. 1D, the two words furthest away (words 142) from the word in question (word 140) are given one point; the next nearest two words are given two points (words 144); and the closest two words (words 148) are given three points. Within these neighboring words, fonts are assigned points based on the location of the words that are in the font. The font having a simple majority of points is the one assigned to the word in question. For example, if the word in question is the fourth of a sequence of seven words, and the first and seventh words are in font one while the second, third, fifth, and sixth words are in font two, then font one has two points and font two has ten points. Consequently, font two would be assigned to the word in question and the font attributes, including the reference ratio, would be assigned to the word.

Before the text is displayed, the original bitmap words are modified in accordance with a correction factor that is the inverse of the reference ratio assigned to the word (step 138 of FIG. 1C). FIG. 1E illustrates one method 150 of modifying the original bitmap words. First, the number of pixels to be turned on or off is determined. The optical density of the original bitmap of the word is multiplied by the correction factor of the word (step 152). This operation yields a corrected optical density. The difference between the corrected and the original optical density is then taken (step 154). This difference multiplied by the total number of pixels used to represent the word is the number of pixels that needs to be added or removed (step 156). If the corrected optical density is greater than the uncorrected optical density, then the pixels are added to the original bitmap (step 160). If the corrected optical density is less than the uncorrected optical density, then the pixels are removed from the original bitmap (step 162).

Then, the pixels are added or removed. FIG. 1F illustrates a method for adding or removing pixels from a bitmap of a word. A bounding box 170 has a fixed number of rows 172 and columns 174. A run is a contiguous string of on pixels in a row (e.g., run 180). A run starts when pixels that are off (e.g., white) transition to pixels that are on (e.g., black, grey, or colored) (176) or when an on pixel is the first pixel of a row (178). A run ends when pixels that are on transition to pixels that are off (182) or when the last pixel of a row is reached (184). A row can have multiple runs (e.g., there are three runs 180 in the bottom row). The number of pixels to be turned on or off to adjust the optical density of a given character is divided by the total number of runs. The resulting number of pixels, to be added or removed per run, is rounded to the nearest integer. This integer number of pixels is added to or removed from each run in the bounding box representing the unit of text. The addition or removal of pixels occurs at alternating ends of the run (i.e., left end, right end, left end, etc.). Additionally, for adjustments that add pixels, no addition beyond the bounding box is made. For adjustments that remove pixels, no run is completely removed.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. The invention can be performed over various regions of text, such as frames, single pages, or multiple pages. In the reference ratio calculation, the optical densities of rendered bitmaps of coded objects can be measured instead of calculated from the coding, or can be pre-calculated and stored. In the bitmap modification step, vertical runs can be used instead of horizontal runs, or a combination of both can be used. Bitmaps of a first unit of text can be modified to achieve a desired optical density rather than modified to match the optical density of a second unit of text. A reference ratio can be calculated for individual characters in a font, and characters can be modified individually according to their own respective reference ratios. Bitmaps of noncoded words, instead of bitmaps of noncoded characters, can be modified. While generally a hybrid display of a digital representation of an image will be generated from an original raster representation derived from a single source image, the digital representation can derive from multiple sources, including some sources that are digital originally. The hybrid display can be derived from a single electronic document in a single electronic file containing both coded and noncoded representations of characters or from multiple documents or files. The invention can be applied in any circumstances where a hybrid display can be generated from a bitmap representing a suspect word (or other unit of text) mixed in with words (or other units of text) rendered from a page description language. The invention can be applied using a variety of page description languages, including, for example, PDF (Adobe® Portable Document Format), PostScript, HyperText Markup Language (HTML), Rich Text Format (RTF), Standard Generalized Markup Language (SGML), and extensible Markup Language (XML). For some page description languages, such as HTML, a language extension, such as CSS (Cascading Style Sheets), provides the fuinctionality required to position text and graphics precisely on a page.

What is claimed is:

1. A method for processing text comprising a first unit of text and a second unit of text, the method comprising:

deriving a correction factor for the first unit of text, the correction factor being derived from a coded representation of the second unit of text and an original noncoded representation of the second unit of text; and modifying an optical density of a representation of the first unit of text in accordance with the correction factor.

2. The method of claim 1, wherein:

the correction factor is calculated by rendering the representation of the second unit of text in a font typeface to generate a rendered representation and calculating a reference ratio of an optical density from the rendered representation and the original noncoded representation of the second unit of text, wherein the font typeface is attributed to both the first unit of text and the second unit of text.

3. The method of claim 1, further comprising:

displaying the modified representation of the first unit of text and an unmodified representation of a second unit of text together on a raster output device.

4. The method of claim 3, wherein the raster-output device is a printer, a raster scan display device, or a digital typesetter.

5. The method of claim 1, further comprising:
storing the text including the modified representation of the first unit of text and an unmodified representation of a second unit of text together in an electronic document.

6. The method of claim 5, wherein the electronic document is represented in a language comprising a page description language selected from a group including PDF, PostScript, RTF, HTML, SGML, and XML.

7. The method of claim 1, wherein:
the first unit of text comprises a noncoded representation of a first word of text and the second unit of text comprises a coded representation of a second word of text; and
the modification reduces a difference between an optical density of the first unit of text and a desired optical density derived from the second unit of text when reproduced by an output device.

8. The method of claim 7, wherein deriving a correction factor comprises:
calculating a reference ratio for a font typeface as the ratio of (i) the overall optical density of an original noncoded representation of a group of characters from the text to (ii) the overall optical density of rendered bitmaps for a coded representation of the same group of characters rendered from the font typeface; and
assigning the inverse of the reference ratio as the correction factor for units of text in the font typeface, wherein the font typeface is attributed to both the first unit of text and the second unit of text.

9. The method of claim 7, wherein the noncoded representation of the first word is a bitmap and wherein modifying the appearance of the first unit of text further comprises:
adjusting the optical density of the first word by modifying the bitmap representation of the first word, wherein pixels are added to, or removed from, the bitmap, or the bitmap is left unchanged, according to the value of the correction factor.

10. The method of claim 9, wherein the number of pixels added or removed is based on the product of the correction factor assigned and the number of on pixels in the word's bitmap.

11. The method of claim 10, wherein adding or removing pixels further comprises:
calculating a number of pixels to be added or removed for each run in the bitmap by dividing the number of pixels to be added or removed by a total number of runs in the bitmap; and
adding or removing the number of pixels to be added or removed for each run at the ends of each run.

12. A computer program product having instructions operable to cause a computer to process text comprising a first unit of text and a second unit of text, the computer program product tangibly stored on a computer-readable medium, wherein the product comprises instructions operable to cause a processor to:
derive a correction factor for the first unit of text, the correction factor being derived from a coded representation of the second unit of text and an original noncoded representation of the second unit of text; and
modify an optical density of a representation of the first unit of text in accordance with the correction factor.

13. The product of claim 12, further comprising instructions to:
calculate the correction factor by rendering the representation of the second unit of text in a font typeface to generate a rendered representation and calculating a reference ratio from the rendered representation and an optical density of the original noncoded representation of the second unit of text, wherein the font typeface is attributed to both the first unit of text and the second unit of text.

14. The product of claim 12, further comprising instructions to:
display the modified representation of the first unit of text and an unmodified representation of a second unit of text together on a raster output device.

15. The product of claim 14, wherein the raster-output device is a printer, a raster scan display device, or a digital typesetter.

16. The product of claim 12, further comprising instructions to:
store the text including the modified representation of the first unit of text and an unmodified representation of a second unit of text together in an electronic document.

17. The product of claim 16, wherein the electronic document is represented in a language comprising a page description language selected from a group including PDF, PostScript, RTF, HTML, SGML, and XML.

18. The product of claim 12, wherein:
the first unit of text comprises a noncoded representation of a first word of text and the second unit of text comprises a coded representation of a second word of text; and
the modification reduces a difference between an optical density of the first unit of text and a desired optical density derived from the second unit of text when reproduced by an output device.

19. The product of claim 18, wherein the instructions operable to cause a computer to derive a correction factor comprise instructions to:
calculate a reference ratio for a font typeface as the ratio of (i) the overall optical density of an original noncoded representation of a group of characters from the text to (ii) the overall optical density of rendered bitmaps for a coded representation of the same group of characters rendered from the font typeface; and
assign the inverse of the reference ratio as the correction factor for units of text in the font typeface, wherein the font typeface is attributed to both the first unit of text and the second unit of text.

20. The product of claim 18, wherein the noncoded representation of the first word is a bitmap and wherein the instructions operable to cause a computer to modify the appearance of the first unit of text comprise instructions to:
adjust the optical density of the first word by modifying the bitmap representation of the first word, wherein pixels are added to, or removed from, the bitmap, or the bitmap is left unchanged, according to the value of the correction factor.

21. The product of claim 20, wherein the number of pixels added or removed is based on the product of the correction factor assigned to the word and number of on pixels in the word's bitmap.

22. The product of claim 21, further comprising instructions to:
calculate a number of pixels to be added or removed for each run in the bitmap by dividing the number of pixels to be added or removed by a total number of runs in the bitmap; and
add or remove the number of pixels to be added or removed for each run at the ends of each run.

23. A system for processing text having a first unit of text and a second unit of text, comprising:
  means for deriving a correction factor for the first unit of text, the correction factor being derived from a coded representation of the second unit of text and an original noncoded representation of the second unit of text; and
  means for modifying an optical density of a representation of the first unit of text in accordance with the correction factor.

24. The system of claim 23, further comprising:
  means for calculating the correction factor by rendering the representation of the second unit of text in a font typeface to generate a rendered representation and calculating a reference ratio from the rendered representation and an optical density of the original noncoded representation of the second unit of text, wherein the font typeface is attributed to both the first unit of text and the second unit of text.

25. The system of claim 23, further comprising:
  means for displaying the modified representation of the first unit of text and an unmodified representation of a second unit of text together on a raster output device.

26. The system of claim 23, further comprising:
  means for storing the text including the modified representation of the first unit of text and an unmodified representation of a second unit of text together in an electronic document.

27. The system of claim 23, wherein:
  the first unit of text comprises a noncoded representation of a first word of text and the second unit of text comprises a coded representation of a second word of text; and
  the modification reduces a difference between an optical density of the first unit of text and a desired optical density derived from the second unit of text when reproduced by an output device.

28. The system of claim 27, further comprising:
  means for calculating a reference ratio for a font typeface as the ratio of (i) the overall optical density of an original noncoded representation of a group of characters from the text to (ii) the overall optical density of rendered bitmaps for a coded representation of the same group of characters rendered from the font typeface; and
  means for assigning the inverse of the reference ratio as the correction factor for units of text in the font typeface, wherein the font typeface is attributed to both the first unit of text and the second unit of text.

29. The system of claim 27, further comprising:
  means for adjusting the optical density of the first word by modifying a bitmap representation of the first word, wherein pixels are added to, or removed from, the bitmap, or the bitmap is left unchanged, according to the value of the correction factor.

30. An electronic document representing text in a page description language, the text having a first unit of text and a second unit of text, wherein a common font typeface is attributed to both the first unit of text and the second unit of text, the electronic document comprising:
  a first unit of text and a second unit of text, wherein a common font typeface is attributed to both the first unit of text and the second unit of text;
  a coded representation of the second unit of text in characters of the common font typeface; and
  a final raster representation of the first unit of text, wherein the final raster representation is a modified representation generated from an original noncoded representation of the first unit of text according to a correction factor, the correction factor being computed from a noncoded representation of the second unit of text and an optical density of a rendered coded representation of the second unit of text.

31. The electronic document of claim 30, wherein:
  the original noncoded representation of the first unit of text is derived from a scanned image of a portion of a paper document containing the first unit of text.

32. The electronic document of claim 30, wherein:
  the page description language is selected from the group including PDF, PostScript, RTF, HTML, SGML, and XML.

* * * * *